G. H. HARMAN.
FOOT SUPPORT AND GUIDE.
APPLICATION FILED OCT. 23, 1914.
1,166,518.
Patented Jan. 4, 1916.
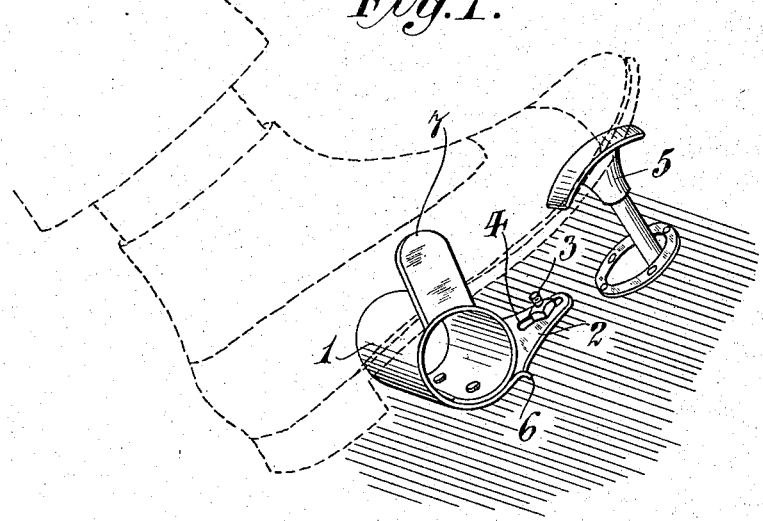
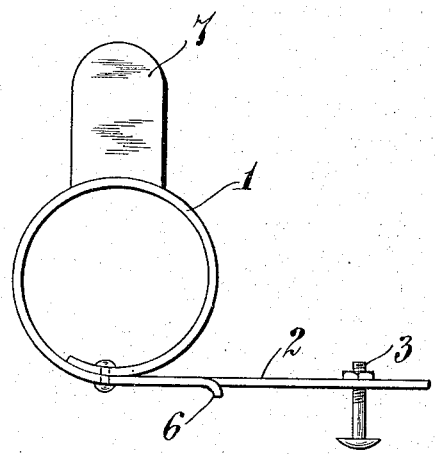
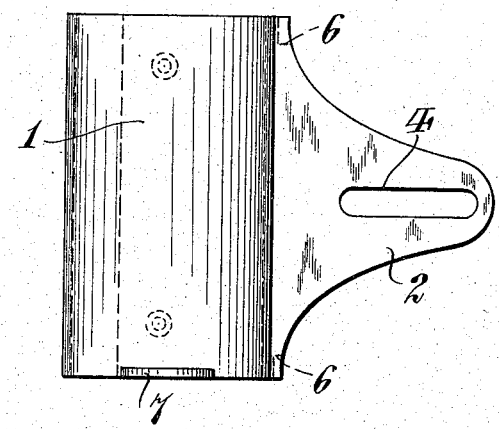

UNITED STATES PATENT OFFICE.

GEORGE H. HARMAN, OF GLEN RIDGE, NEW JERSEY.

FOOT SUPPORT AND GUIDE.

1,166,518.  Specification of Letters Patent.  Patented Jan. 4, 1916.

Application filed October 23, 1914. Serial No. 868,184.

*To all whom it may concern:*

Be it known that I, GEORGE H. HARMAN, a citizen of the United States, and a resident of Glen Ridge, county of Essex, State of New Jersey, have invented an Improvement in Foot Supports and Guides, of which the following description, in connection with the accompanying drawings, is a specification, like letters on the drawings representing like parts.

The present invention relates to a device adapted to be used in connection with the power control mechanism of an automobile, the object being to provide a support and guide for the driver's foot in order that it may be positioned correctly to engage the accelerator or other similar movable part.

In the drawings which accompany this specification, I have illustrated one embodiment of my invention.

Figure 1 is a view in perspective of a foot support and guide attached to the floor of an automobile in a position adjacent to the accelerator. Fig. 2 is a side elevation, and Fig. 3 is a plan view of the device itself.

Referring to Fig. 1 of the drawings, the foot support and guide there illustrated comprises a support or spacing portion here shown as tubular member 1 which may be fastened to the floor of an automobile by any suitable means, as by a base member having a projecting strap 2 and a coöperating nut and bolt 3. A slot 4 in the strap 2 permits adjustment of the device relative to an accelerator 5 or other power control member in a manner to permit the foot support to be adjusted correctly for different drivers. The device may be further provided with means for preventing slipping after it is attached, such as lugs 6 which engage the indentations forming a part of the roughened surface commonly found in metallic floors of automobiles. A guiding portion 7 may be located in a position to limit the movement of the driver's foot in shifting from one part of the power control mechanism to that part equipped with the foot supporting device.

Considerable difficulty has been experienced by drivers of automobiles, particularly in regulating the gasolene feed while traversing rough roads. Although this control is commonly effected by means of a hand operated throttle attached to the steering-post, most cars are also equipped with a so-called foot accelerator which is used more generally in active driving than the hand throttle. I have found that this accelerator may be more accurately controlled by the driver if his foot is suitably supported adjacent thereto. A spacing member, illustrated in the drawings as the tubular portion 1, may be thus utilized to provide a fulcrum upon which the foot may act as a lever with the free end pressing upon the accelerator 5. While my invention does not require that the spacing member be of any particular shape, I prefer the cylindrical form shown in the drawings because it lends itself readily to manufacture besides providing a comfortable and efficient support for the foot.

In order that the device may be effectively used by different persons or under varying circumstances, it may be provided with means for adjustment, particularly in a longitudinal direction. By slacking up on the nut and bolt fastening 3, heretofore referred to as coöperating with the slot 4, the device may be shifted either toward or away from the accelerator 5, or, it may be swung in an arc with the bolt as a pivot. When the proper position is determined by trial, the apparatus may be fastened securely by tightening up on the nut and bolt and it may be further secured against slipping or creeping by the lugs 6, referred to above, engaging indentations in the floor.

Inasmuch as the driver of an automobile ordinarily has to operate a clutch and at least one brake in addition to the foot accelerator, it may at times be necessary to shift quickly from the clutch or brake pedal to the accelerator. In order that this shifting may be accomplished quickly and bring the foot into proper position with relation to the accelerator, I have provided the guide member 7, shown in the present embodiment of my invention as projecting upwardly from the uppermost surface of the spacing member 1. When the foot is moved quickly in the direction of the supporting device it will be guided to its proper position of engagement with the member 1 by contact with the guide 7. This guide has the additional utility of steadying the foot when the car is traversing a rough road so that the driver may at all times have effective control of the gasolene feed. It is contemplated that the present invention in its broadest aspect may be incorporated in the car so as to form possibly an integral part of the foot-board or other portion adjacent to the power control mechanism. The form illustrated however, is one which may readily be attached to cars already constructed.

I claim as my invention:

1. A foot support for use with the power control mechanism of an automobile or the like, comprising a rigid foot supporting member having an arch engaging portion adapted to contact with the arch of a driver's foot across its entire width and to provide a curved bearing surface, whereby, in changing the angular position of the foot in a vertical plane, the arch may uninterruptedly traverse the arch engaging portion along a succession of transverse lines of contact.

2. A foot support for use with the power control mechanism of an automobile or the like, comprising a rigid foot supporting member having an arch engaging portion adapted to contact with the arch of a driver's foot across its entire width and to provide a curved bearing surface, whereby, in changing the angular position of the foot in a vertical plane, the arch may uninterruptedly traverse the arch engaging portion along a succession of transverse lines of contact, and means for limiting movement of the foot longitudinally with respect to said arch engaging portion.

3. A foot support for use with the power control mechanism of an automobile or the like, comprising a rigid foot supporting member having an arch engaging portion adapted to contact with the arch of a driver's foot across its entire width and to provide a curved bearing surface, whereby, in changing the angular position of the foot in a vertical plane, the arch may uninterruptedly traverse the arch engaging portion along a succession of transverse lines of contact, means for limiting movement of the foot longitudinally with respect to said arch engaging portion, and means for attaching said spacing member to the floor of an automobile or the like.

In testimony whereof, I have signed my name to this specification, in the presence of two subscribing witnesses, this 22nd day of October, 1914.

GEORGE H. HARMAN.

Witnesses:
 THOS. J. SHANNON,
 E. W. SULLIVAN.